INFORMATION STORAGE DEVICES

Filed Sept. 18, 1963 5 Sheets-Sheet 1

Inventors
M. W. GRIBBLE
K. C. JOHNSON
By
Cameron, Kerkam & Sutton
Attorneys

INFORMATION STORAGE DEVICES

Filed Sept. 18, 1963 5 Sheets-Sheet 2

Inventors
M. W. GRIBBLE
K. C. JOHNSON
By
Cameron, Kerkam & Sutton
Attorneys

Inventors
M. W. GRIBBLE
K. C. JOHNSON
By
Cameron, Kirkam & Sutton
Attorneys

Inventors
M. W. GRIBBLE
K. C. JOHNSON
By Cameron, Kerkam & Sutton
Attorneys

Inventors
M. W. GRIBBLE
K. C. JOHNSON
By Cameron, Kerkam & Sutton
Attorneys

United States Patent Office 3,218,613

Patented Nov. 16, 1965

3,218,613
INFORMATION STORAGE DEVICES

Maurice Woolmer Gribble, Marple, and Kenneth Charles Johnson, Gatley, Cheadle, England, assignors to Ferranti, Limited, Hollinwood, Lancashire, England, a company of Great Britain and Northern Ireland Filed Sept. 18, 1963, Ser. No. 309,699
Claims priority, application Great Britain, Sept. 22, 1962, 36,136/62
18 Claims. (Cl. 340—173)

Figure 1:
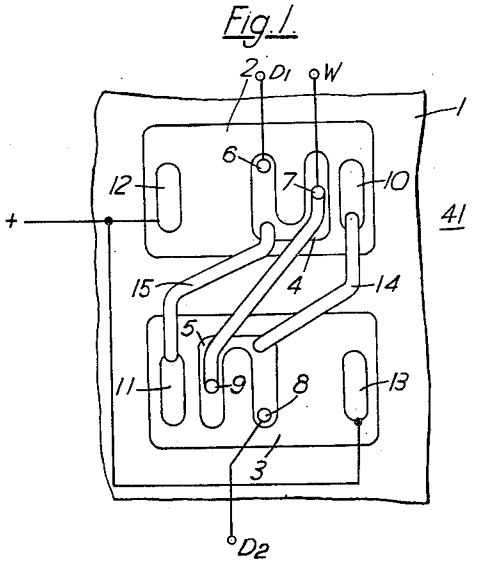

This invention relates to information storage devices.

According to the present invention an information storage device includes a slice of semiconductor material having formed thereon a matrix of storage cells each comprising a bi-stable transistor circuit, each cell thus being capable of storing one binary bit of information, and a system of conductors formed on said slice by means of which any one of said cells may be selected and information written into or read out from said one cell.

Each of said storage cells may comprise first and second zones of one conductivity kind, each zone having formed thereon a base area of opposite conductivity kind and two separate emitters of said one conductivity kind formed on each said base area, the shape of said base area and the position of said emitters being such that there are effectively formed first and second transistors having their collectors connected via a resistive path, a first contact area for making substantially direct electrical contact with the collector of said first transistor and a second contact area for making contact with the collector of said second transistor via a resistive path, a bi-stable transistor circuit being formed by making direct electrical connections between the first contact area of said first zone and the base area of said second zone, between the first contact area of said second zone and the base area of said first zone, between the second contact area of said first zone and the second contact area of said second zone, and between the emitters of said first transistors of said first and second zones, in which case said system of conductors may include separate conductors connected to the emitters of said second transistors of said first and second zones and to the coupled emitters of said first transistors of said first and second zones whereby in operation voltage pulses may be applied to cause the conductive path to change from one of said first transistors to one of said second transistors of said first and second zones.

Alternatively, each of said storage cells may comprise first and second zones of one conductivity kind, each zone having formed thereon a base area of opposite conductivity kind and three separate emitters of said one conductivity kind formed on each said base area, the shape of said base area and the position of said emitters being such that there are effectively formed first, second and third transistors, the collector of the third transistor being connected to the collector of the first transistor via a resistive path, a first contact area for making substantially direct electrical contact with the collectors of said first and second transistors and a second contact area for making contact with the collector of said third transistor via a resistive path, a bi-stable transistor circuit being formed by making direct electrical connections between the first contact area of said first zone and the base area of said second zone, between the first contact area of said second zone and the base area of said first zone, between the second contact area of said first zone and the second contact area of said second zone, between the emitter of the first transistor of said first zone and the emitter of the first transistor of said second zone, and between the emitter of the second transistor of said first zone and the emitter of the second transistor of said second zone, in which case said system of conductors may include separate conductors connected to the emitters of said third transistors of said first and second zones, the coupled emitters of said first transistors, and the coupled emitters of said second transistors of said first and second zones whereby in operation voltage pulses may be applied to cause the conductive path to change from said first and second transistors of one of said first and second zones to the third transistor of one of said first and second zones.

Figure 2:
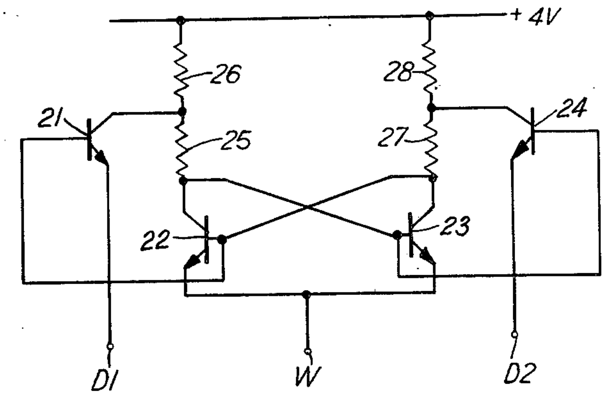
Figure 3:
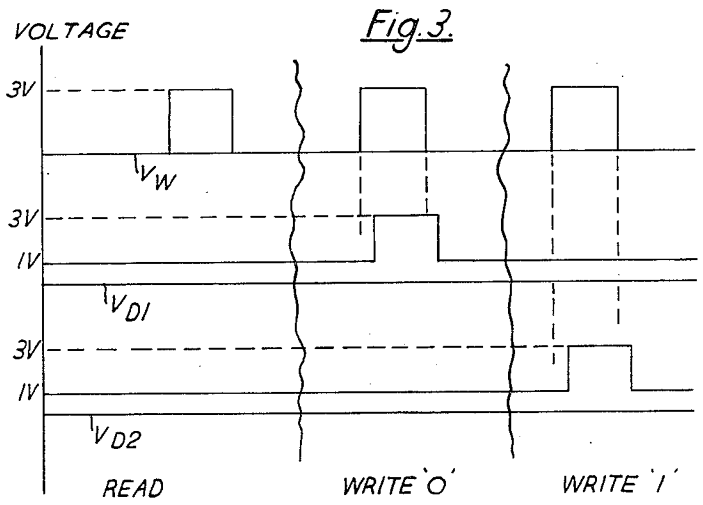
Figure 4:
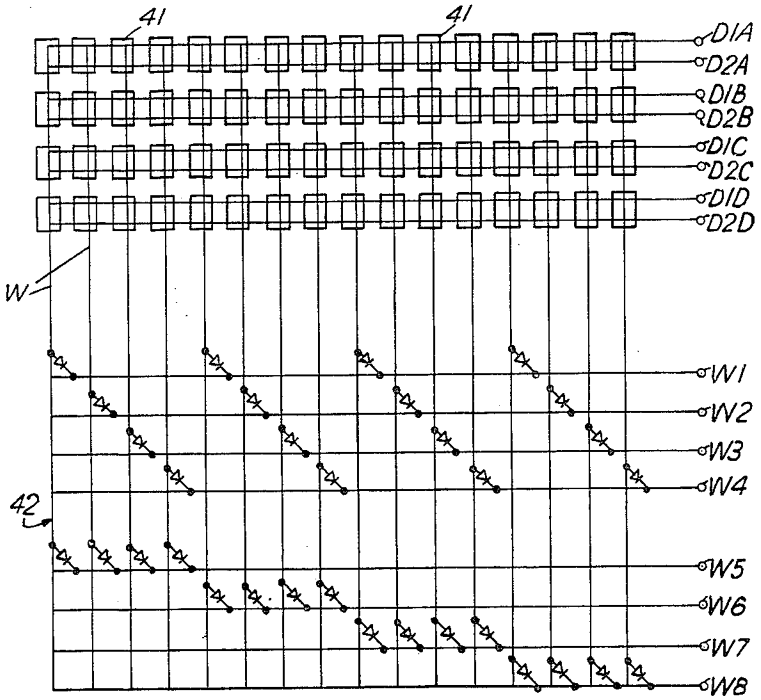
Figure 5:
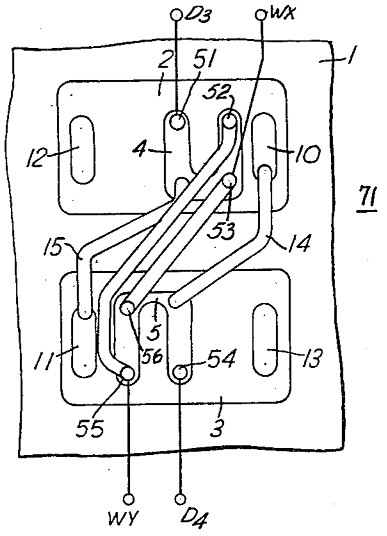
Figure 6:
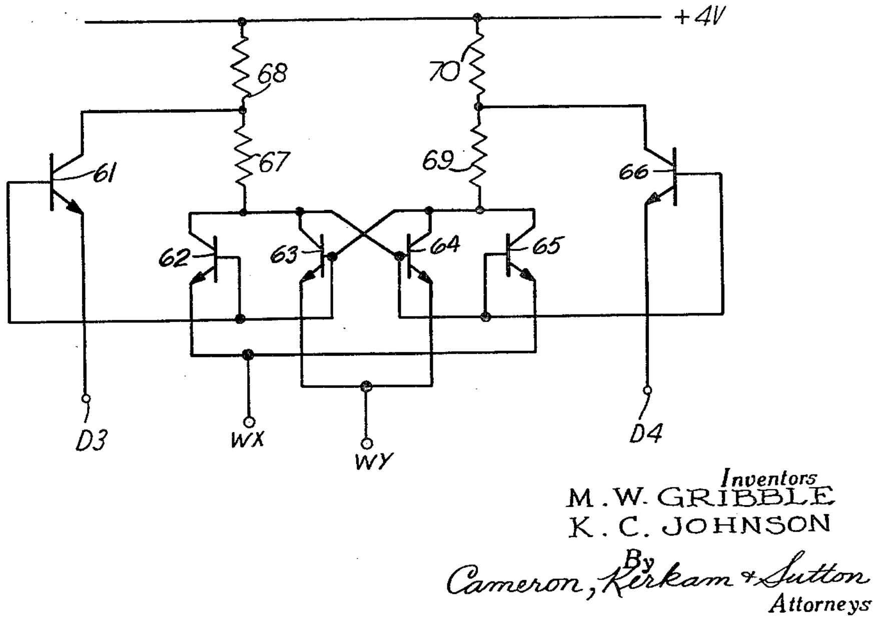
Figure 7:
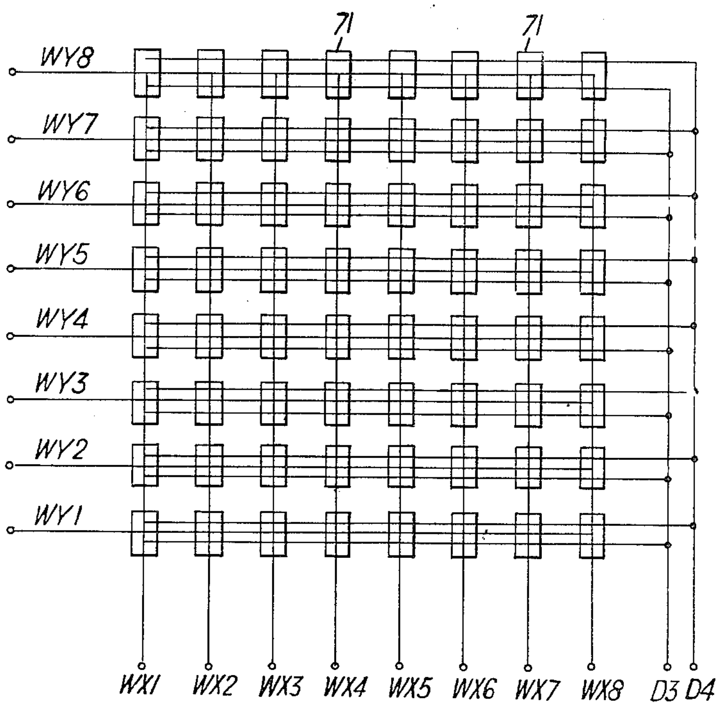
Figure 8:
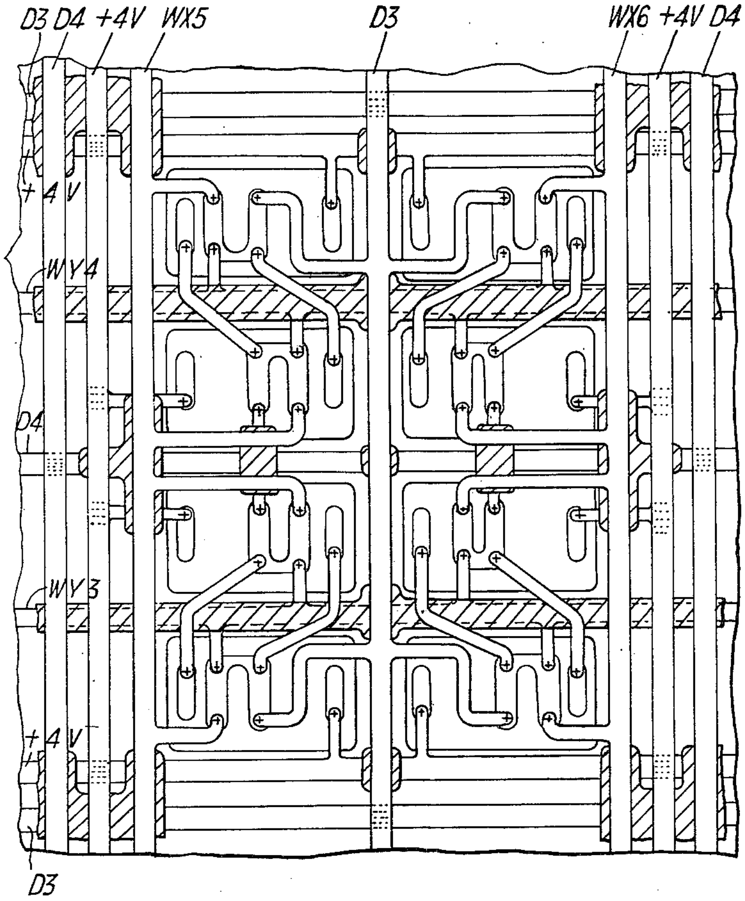

The present invention will now be described by way of example with reference to the accompanying drawings in which:

FIGURE 1 shows the pattern of a single storage cell of a storage device in accordance with the invention, FIGURE 2 shows the equivalent circuit and connections of the storage cell shown in FIGURE 1, FIGURE 3 is a waveform diagram for illustrating the operation of the circuit shown in FIGURE 2, FIGURE 4 is a schematic diagram showing a sixty four bit storage device using storage cells of the kind shown in FIGURE 1 and a diode decoding network for use therewith, FIGURE 5 shows a modified form of the single storage cell shown in FIGURE 1, FIGURE 6 shows the equivalent circuit and connections of the storage cell shown in FIGURE 5, FIGURE 7 is a schematic diagram showing a sixty four bit storage device using storage cells of the kind shown in FIGURE 5, and FIGURE 8 shows part of a slice of semiconductor material having formed thereon storage cells of the kind shown in FIGURE 5 together with the system of conductors.

Storage devices in accordance with the present invention include a slice of semiconductor material having formed thereon a matrix of storage cells. FIGURE 1 shows one storage cell of a storage device in accordance with the invention formed on a slice 1 of silicon. The slice 1 of silicon is covered with an N-type epitaxial layer treated with a P-type diffusion to leave for each storage cell first and second zones 2 and 3 of the epitaxial N-type layer. Each of the zones 2 and 3 has a U-shaped P-type base area 4, 5 diffused onto it and N-type emitters 6, 7 and 8, 9 are diffused onto the base areas 4 and 5 respectively. Each of the zones 2 and 3 is also provided with a first contact area 10, 11 adjacent one leg of the base area 4, 5 and with a second contact area 12, 13 spaced from the other leg of the base area 4, 5. The contact area 10 of the zone 2 is connected to the base area 5 of the zone 3 via a deposited aluminium conductor 14 and the contact area 11 of the zone 3 is connected to the base area 4 of the zone 2 via a deposited aluminium conductor 15. A further system of conductors (not shown) is also formed on the slice 1 and includes separate conductors connected to the emitters 6 and 8, a conductor connected to both of the emitters 7 and 9, and a positive voltage supply conductor connected to the contact area 12 and 13.

The equivalent circuit of the storage cell just described is shown in FIGURE 2 and includes two pairs of common base NPN transistors 21, 22 and 23, 24, the collectors of the transistors 22 and 23 being connected to the positive voltage supply conductor via resistances 25, 26 and 27, 28 respectively. The collectors and emitters of the transistors 22 and 23 are cross-connected (via conductors 14 and 15, FIGURE 1) and the collectors of the transistors 21 and 24 are connected to the junctions between the resistances 25 and 26, and 27 and 28 respectively. The resistances 26 and 28 are formed by the N-type epitaxial layer between the contact area 12 and 13 and the base areas 4 and 5 respectively and the resistances 25 and 27 are formed by the N-type epitaxial layer between the legs of the U-shaped base areas 4 and 5 respectively.

The emitters (6 and 8, FIGURE 1) of the transistors 21 and 24 are connected to separate conductors D1, D2 and the emitters (7 and 9, FIGURE 1) of the transistors 22 and 23 are both connected to a conductor W.

In operation the transistors 22 and 23 form a first direct coupled bi-stable circuit and the transistors 21 and 24 form a second bi-stable circuit. The positive voltage conductor is held at four volts and under storage conditions the W conductor is held at zero volts and the D1 and D2 conductors are both held at plus one volt. The transistors 21 and 24 are therefore cut off and one of the transistors 22 and 23 is conducting to saturation to store one binary bit, the transistor 22 conducting, for example, to store a "one" and the transistor 23 conducting to store a "nought." The resistors 25 and 27 prevent any flow of current in the reverse direction through the transistors 21 and 24 as could possibly happen if the collectors of the transistors 21 and 24 were connected directly to the collectors of the transistors 22 and 23.

Assume that a "one" is being stored in a storage cell, i.e. that transistor 22 is conducting. To read this information out of the storage cell a positive going pulse of three volts amplitude is applied to the W conductor. This cuts off the transistor 22 but as the base voltage rises the transistor 21 starts to conduct, the transistor 24 remaining cut-off. There is therefore an increase in the current flowing in the conductor D1 throughout the duration of the pulse on the conductor W and the resultant current pulse is utilised to indicate that a "one" is stored in that particular storage cell. At the end of the pulse on the conductor W the transistor 21 will be cut off and the transistor 22 will again start to conduct rather than the transistor 23 due to the more positive base voltage. The read-out from the storage cell is therefore non-destructive.

To write fresh information into the store is a positive going pulse of three volts amplitude is again applied to the conductor W and the D1 or D2 rail is also pulsed to plus three volts according to whether it is desired to store a "nought" or a "one." Suppose, for example, that it is desired to change the stored bit of a "one" to a "nought." The application of the pulse to the conductor W causes the transistor 22 to cut off and, in the absence of a pulse on the conductor D1, the transistor 21 starts to conduct as described above. If, however, at some time during the application of the pulse to the conductor W the conductor D1 is pulsed to plus three volts, the conductor D2 remaining at plus one volt, the transistor 21 is cut off and the transistor 24 starts to conduct due to the bi-stable connection of the transistors 21 and 24. When the voltage pulse applied to the conductor W ends the transistor 24 cuts off and the transistor 23 starts to conduct, thereby storing a "nought." Thus to change the stored information, it is only necessary for the voltage pulses applied to the conductors W and D1 or D2 to overlap, as shown in FIGURE 3, and there is therefore no requirement for critical synchronisation between the pulses. A subsequent reading voltage pulse applied to the conductor W alone will cause an output current pulse on the conductor D2.

Since each storage cell of the kind shown in FIGURE 1 is read by the application of a single voltage pulse it is desirable to use a decoding network for selecting one or more of the storage cells. FIGURE 4 shows schematically a sixty-four bit storage device using storage cells of the kind shown in FIGURE 1 in which the storage cells 41 are arranged in a matrix of sixteen separate word groups with four storage cells in each group. Four pairs of conductors D1A, D2A . . . D1D, D2D are connected to the transistors 21 and 24 of the corresponding storage cells in each group, and the transistors 22 and 23 of each group are connected to a common conductor W. The sixteen conductors W are connected to eight word input leads W1 . . . W8 by means of a two dimensional diode matrix 42, the diodes of which are fabricated on the same slice of silicon as the storage cells 41. The diodes of the diode matrix 42 are arranged such that the emitter currents of the transistors 22 and 23 in each groups of four storage cells may be taken by either of two diodes to two of the word input leads W1 . . . W8. Thus to select a particular group of four storage cells a reading voltage pulse must be applied to one of the word input leads W1 . . . W8 and one of the word input leads W5 . . . W8 and the four bit output of the group is delivered in parallel on the appropriate ones of the conductors D1A, D2A . . . D1D, D2D. Similarly, to write information into a particular group a voltage pulse must be applied to one of the input leads W1 . . . W4 and one of the word input leads W5 . . . W8 and also to the appropriate ones of the conductors D1A, D2A . . . D1D, D2D.

FIGURE 5 shows a modification to the storage cell shown in FIGURE 1 by means of which the requirement for the diode decoding network shown in FIGURE 4 is avoided. The storage cell shown in FIGURE 5 is similar to that shown in FIGURE 1 except for the provision of three emitters 51, 52, 53 and 54, 55, 56 on the U-shaped base areas 4 and 5 respectively. In this storage device a further system of conductors (to be described later) is formed on the slice 1 and includes separate conductors connected to the emitters 51 and 54, a conductor connected to both of the emitters 52 and 55, a conductor connected to both of the emitters 53 and 56 and a positive voltage supply conductor connected to the contact areas 12 and 13.

The equivalent circuit of the storage cell just described is shown in FIGURE 6 and comprises two set of three common base NPN transistors 61, 62, 63 and 64, 65, 66. The collectors of the transistors 62, and 63 are both connected to the common base of the transistors 64, 65, 66 and also to the positive voltage supply conductor via resistances 67 and 68. Similarly, the collectors of the transistors 64 and 65 are both connected to the common base of the transistors 61, 62 and 63 and to the positive voltage supply conductor via resistances 69 and 70. The collectors of the transistors 61 and 66 are connected to the junctions between the resistances 67 and 68, and 69 and 70 respectively. The resistances 67 . . . 70 are formed in the same manner as the resistances 25 . . . 28 of FIGURE 2.

The emitters (51 and 54, FIGURE 5) of the transistors 61 and 66 are connected to separate conductors D3 and D4, the emitters (52 and 55, FIGURE 5) of the transistors 62 and 64 are both connected to a conductor WX, and the emitters (53 and 56, FIGURE 5) of the transistors 63 and 65 are both connected to a conductor WY.

In operation the transistors 62 and 64 and the transistors 63 and 65 form direct coupled bi-stable circuits and the transistors 61 and 66 form a further bi-stable circuit. The positive voltage supply conductor is held at four volts and under storage conditions the WX and WY conductors are held at zero volts and the conductors D3 and D4 are both held at plus one volt. The transistors 61 and 66 are therefore cut off and the transistors 62 and 63 or the transistors 64 and 65 are conducting to store, for example, a "one" or a "nought" respectively.

Assuming that a "one" is being stored, i.e. the transistors 62 and 63 are conducting, the application of a positive going voltage pulse of three volts amplitude to the conductor WX or the conductor WY alone will only have the effect of cutting off one of the transistors 62 and 63 and leaving the other conducting, the transistor 61 therefore remaining cut-off. To read the information stored in the storage cell positive going voltage pulses of three volts amplitude must therefore be applied to both of the conductors WX and WY to cut off both of the transistors 62 and 63 and thereby cause the transistor 61 to start conducting to cause an output current pulse on the conductor D3. Similarly, to write information into the storage cell positive going voltage pulses of three volts amplitude must be applied to both of the conductors WX and WY and the appropriate one of the conductors D3 and D4 pulses to plus three volts.

Since the storage cells of the kind shown in FIGURE 5 require the application of voltage pulses to both of the conductors WX and WY for information to be written into or read out of the cell, the cells may be arranged in a simple matrix. FIGURE 7 shows schematically a sixty four bit storage device using storage cells of the kind shown in FIGURE 5 in which the storage cells 71 are arranged in a matrix of eight columns and eight rows. The conductors WX of the storage cells in each row are connected to a common conductor WX1 . . . WX8 and the conductors WY of the storage cells in each column are connected to a common conductor WY1 . . . WY8. The conductors D3 and D4 are common to all of the cells.

To select a particular storage cell positive going voltage pulses of three volts amplitude are applied to one of the conductors WX1 . . . WX8 and one of the conductors WY1 . . . WY8 and the information may then be read out of the cell as a current pulse on one of the conductors D3 and D4 or fresh information may be written into the store by pulsing the appropriate one of the conductors D3 and D4 to plus three volts.

FIGURE 8 shows part of a silicon slice having formed thereon the matrix shown schematically in FIGURE 7, four of the storage cells being shown. The hatched portions indicate layers of electrically insulating material such as silicon monoxide, required to separate the aluminum conductors at cross-over points, and the portions marked with dots indicate junctions between the conductors at those positions. The positions marked with a cross mark the contacts between the aluminum conductors and the emitter, base and contact areas of the storage cells.

Although the storage cells have been described above as being formed on an N-type epitaxial layer to give effectively an NPN transistor circuit, it will be appreciated that the storage cells could also be formed on a P-type epitaxial layer to give effectively a PNP transistor circuit.

What we claim is:

1. An information storage device including a slice of semiconductor material having formed thereon a matrix of storage cells, each storage cell comprising two zones of one conductivity kind, each zone having formed thereon a base area of opposite conductivity kind and a plurality of emitters of said one conductivity kind formed on each said base area to form a plurality of transistors, and interconnections between said transistors to form a bi-stable circuit such that each storage cell is capable of storing one binary bit of information, and a system of conductors formed on said slice by means of which any one of said cells may be selected and information written into or read out from said one cell.

2. An information storage device including a slice of semiconductor material having formed thereon a matrix of storage cells, each storage cell comprising first and second zones of one conductivity kind, each zone having formed thereon a base area of opposite conductivity kind and two separate emitters of said one conductivity kind formed on each said base area, the shape of each said base area and the position of said emitters thereon being such that there are effectively formed on each of said first and second zones a first transistor and a second transistor having their collectors formed by regions of said zone and connected via a resistive path, each of said first and said second zones also having formed thereon a first contact area for making substantially direct electrical contact with the collector of said first transistor of that zone and a second contact area for making contact with the collector of said second transistor of that zone via a resistive path, and direct electrical connections between the first contact area of said first zone and the base area of said second zone, between the first contact area of said second zone and the base area of said first zone, between the second contact area of said first zone and the second contact area of said second zone, and between the emitters of said first transistors of said first and second zones, said direct electrical connections forming a bi-stable transistor circuit such that each storage cell is capable of storing one binary bit of information, and a system of conductors formed on said slice by means of which any one of said cells may be selected and information written into or read out from said one cell.

3. An information storage device as claimed in claim 2 in which the base area of each of said zones is U-shaped and has one emitter formed on each leg thereof.

4. An information storage device as claimed in claim 3 in which on each of said zones said first contact area is adjacent one leg of said base area and said second contact area is spaced from the other leg of said base area.

5. An information storage device as claimed in claim 2 in which said system of conductors includes for each storage cell of said matrix separate conductors connected to the emitters of said second transistors of said first and second zones and to the coupled emitters of said first transistors of said first and second zones, whereby in operation voltage pulses may be applied to cause the conductive path to change from one of said first transistors to one of said second transistors of said first and second zones.

6. An information storage device as claimed in claim 2 in which said system of conductors includes for each row of said matrix first and second conductors connected to the emitters of said second transistors of said first and second zones respectively of each storage cell in said row, and for each column of said matrix a third conductor connected to the coupled emitters of said first transistors of said first and second zones of each storage cell in said column, whereby in operation information may be written into any one storage cell of said storage device by applying overlapping voltage pulses to one of said first or said second conductors and one of said third conductors, and stored information may be read out of any one column of said storage device by applying a voltage pulse to one of said third conductors.

7. An information storage device as claimed in claim 2 in which there is additionally formed on said slice a diode decoding network for selecting one or more of said storage cells.

8. An information storage device including a slice of semi-conductor material having formed thereon a matrix of storage cells, each storage cell comprising first and second zones of one conductivity kind, each zone having formed thereon a base area of opposite conductivity kind and three separate emitters of said one conductivity kind formed on each said base area, the shape of each said base area and the position of said emitters thereon being such that there are effectively formed on each of said first and second zones first, second and third transistors having their collectors formed by regions of said zone, the collector of the third transistor being connected to the collector of the first transistor via a resistive path, each of said first and second zones also having formed thereon a first contact area for making substantially direct electrical contact with the collectors of said first and said second transistors of that zone and a second contact area for making contact with the collector of said third transistor of that zone via a resistive path, direct electrical connections between the first contact area of the first zone and the base of said second zone, between the first contact area of said second zone and the base area of said first zone, between the second contact area of said first zone and the second contact area of said second zone, between the emitter of the first transistor of said first zone and the emitter of the first transistor of said second zone, and between the emitter of said second transistor of said first zone and the emitter of said second transistor of said second zone, said direct electrical connections forming a bi-stable transistor circuit such that said storage cell is capable of storing one binary bit of information and a system of conductors formed on said slice by means of which any one of said cells may be selected and information written into or read out from said one cell.

9. An information storage device as claimed in claim 8 in which the base area of each of said zones is U-shaped and has two emitters formed on one leg thereof and a third emitter formed on the other leg thereof.

10. An information storage device as claimed in claim 9 in which on each of said zones said first contact area is adjacent said one leg of said base area having two emitters formed thereon and said second contact area is spaced from the other leg of said base area.

11. An information storage device as claimed in claim 8 in which said system of conductors includes for each of said storage cells separate conductors connected to the emitters of said third transistors of said first and second zones, to the coupled emitters of said first transistors, and to the coupled emitters of said second transistors of said first and second zones, whereby in operation voltage pulses may be applied to cause the conductive path to change from said first and second transistors of one of said first and second zones to the third transistor of one of said first and second zones.

12. An information storage device as claimed in claim 8 in which said system of conductors includes for each storage cell of matrix first and second conductors connected to the emitters of said third transistors of said first and second zones respectively, for each row of said matrix a third conductor connected to the coupled emitters of said first transistors of said first and second zones of each storage cell in said row, and for each column of said matrix a fourth conductor connected to the coupled emitters of said second transistors of said first and second zones of each storage cell in said column, whereby in operation information may be written into any one storage cell of said storage device by applying overlapping voltage pulses to said first or said second conductor and to one of said third and one of said fourth conductors, and stored information may be read out of any one storage cell by applying overlapping voltage pulses to one of said third and one of said fourth conductors.

13. A storage cell for use in an information storage device comprising a slice of semiconductor material having formed thereon first and second zones of one conductivity kind, each zone having formed thereon a base area of opposite conductivity kind and two separate emitters of said one conductivity kind formed on each said base area, the shape of each said base area and the position of said emitters thereon being such that there are effectively formed on each of said first and second zones a first transistor and a second transistor having their collectors formed by regions of said zone and connected via a resistive path, each of said first and second zones also having formed thereon a first contact area for making substantially direct electrical contact with the collector of said first transistor of that zone and a second contact area for making contact with the collector of said second transistor of that zone via a resistive path, and direct electrical connections between the first contact area of said first zone and the base area of said second zone, between the first contact area of said second zone and the base area of said first zone, between the second contact area of said first zone and the second contact area of said second zone, and between the emitters of said first transistors of said first and second zones, said direct electrical connections forming a bi-stable transistor circuit such that said storage cell is capable of storing one binary bit of information.

14. A storage cell as claimed in claim 13 in which the base area of each of said zones is U-shaped and has one emitter formed on each leg thereof.

15. A storage cell as claimed in claim 14 in which on each of said zones said first contact area is adjacent one leg of said base area and said second contact area is spaced from the other leg of said base area.

16. A storage cell for use in an information storage device comprising a slice of semiconductor material having formed thereon first and second zones of one conductivity kind, each zone having formed thereon a base area of opposite conductivity kind and three separate emitters of said one conductivity kind formed on each said base area, the shape of each said base area and the position of said emitters thereon being such that there are effectively formed first, second and third transistors having their collectors formed by regions of said zone, the collector of the third transistor being connected to the collector of the first transistor via a resistive path, each of said first and second zones also having formed thereon a first contact area for making substantially direct electrical contact with the collectors of said first and second transistors of that zone and a second contact area for making contact with the collector of said third transistor of that zone via a resistive path, and direct electrical connections between the first contact area of said first zone and the base of said second zone, between the first contact area of said second zone and the base area of said first zone, between the second contact area of said first zone and the second contact area of said second zone, between the emitter of the first transistor of said first zone and the emitter of the first transistor of said second zone, and between the emitter of said second transistor of said first zone and the emitter of the second transistor of said second zone said direct electrical connections forming a bistable transistor circuit such that said storage cell is capable of storing one binary bit of information.

17. A storage cell as claimed in claim 16 in which the base area of each of said zones is U-shaped and has two emitters formed on one leg thereof and a third emitter formed on the other leg thereof.

18. A storage cell as claimed in claim 17 in which on each of said zones said first contact area is adjacent said one leg of said base area having two emitters formed thereon and said second contact area is spaced from the other leg of said base area.

References Cited by the Examiner

UNITED STATES PATENTS

| | | | |
|---|---|---|---|
| 2,820,155 | 1/1958 | Linvill | 340—166 X |
| 2,825,889 | 3/1958 | Henle | 340—173 |
| 2,945,964 | 7/1960 | Vutz | 307—88.5 |
| 3,072,832 | 1/1963 | Kilby | 317—235 |
| 3,103,599 | 9/1963 | Henkels | 307—88.5 |
| 3,109,163 | 10/1963 | Meuller | 340—173 |
| 3,138,743 | 6/1964 | Kilby | 317—101 |

IRVING L. SRAGOW, *Primary Examiner.*